United States Patent [19]

Chi et al.

[11] Patent Number: 5,043,563
[45] Date of Patent: Aug. 27, 1991

[54] PORTABLE OVERHEAD BAR CODE SCANNER

[75] Inventors: Chen Chi, Gilbert, Ariz.; Ronald J. King, New Concord; Herbert D. McClain, Quaker City, both of Ohio

[73] Assignee: NCR Corporation, Dayton, Ohio

[21] Appl. No.: 365,864

[22] Filed: Jun. 14, 1989

[51] Int. Cl.$^5$ .............................................. G06K 7/10
[52] U.S. Cl. ...................................... 235/467; 235/437
[58] Field of Search ............... 235/437, 454, 462, 467; 250/236

[56] References Cited

U.S. PATENT DOCUMENTS

| | | | |
|---|---|---|---|
| 3,076,957 | 2/1963 | Hankes et al. | 340/173 |
| 3,596,060 | 7/1971 | Tibbals, Jr. et al. | 235/61.11 E |
| 3,676,645 | 7/1972 | Fickenscher et al. | 235/61.11 E |
| 3,728,677 | 4/1973 | Munson | 340/146.3 F |
| 3,774,014 | 11/1973 | Berler | 235/61.11 E |
| 3,889,102 | 6/1975 | Dahlquist | 235/61.7 R |
| 3,916,158 | 10/1975 | Sansone et al. | 235/467 |
| 3,928,759 | 12/1975 | Sansone | 235/467 |
| 4,097,729 | 6/1978 | Seligman | 235/467 |
| 4,251,798 | 2/1981 | Swartz et al. | 340/146.3 |
| 4,369,361 | 1/1983 | Swartz et al. | 235/470 |
| 4,496,831 | 1/1985 | Swartz et al. | 235/472 |
| 4,560,862 | 12/1985 | Eastman et al. | 235/467 |
| 4,575,625 | 3/1986 | Knowles | 235/467 |
| 4,587,407 | 5/1986 | Ahmed et al. | 235/467 |
| 4,652,732 | 3/1987 | Nickl | 235/462 |
| 4,766,297 | 8/1988 | McMillan | 235/455 |
| 4,894,523 | 1/1990 | Chadima, Jr. et al. | 235/462 |

FOREIGN PATENT DOCUMENTS 0036781 3/1981 European Pat. Off. .

Primary Examiner—Stuart S. Levy
Assistant Examiner—Richard Weinberg
Attorney, Agent, or Firm—Wilbert Hawk, Jr.; Albert L. Sessler, Jr.; Richard W. Lavin

[57] ABSTRACT

A portable bar code scanner includes a base member and a overhanging scanning housing secured to the base member. A laser power supply mounted in the housing outputs a laser beam along a first light path directed to a compact optical system in the housing which reflects the laser beam along a second light path which intersects the first light path at approximately ninety degress to scan a coded label positioned below the scaning housing. A collection lens mounted in the housing collects and directs the reflected light from the coded label to a detector which generates electrical signals for transmission over a cable to a processor.

15 Claims, 3 Drawing Sheets

PORTABLE OVERHEAD BAR CODE SCANNER

BACKGROUND OF THE INVENTION

The present invention is directed to optical bar code scanning devices and more particularly to a portable bar code scanning device in which a bar code label is moved under the stationary scanning head during a merchandise checkout operation.

In present-day merchandising point-of-sale operations, data pertaining to the purchase of a merchandise item is obtained by reading data encoded indicia such as a bar code label printed on or attached to the merchandise item. In order to standardize the bar codes used in various point-of-sale checkout systems, the grocery industry has adopted a uniform product code (UPC) which is in the form of a bar code. Reading systems which have been constructed to read this bar code include hand-held wands which are moved across the bar code and stationary optical scanning systems normally located within the cabinet structure of a checkout counter in which the bar code is read when a purchased merchandise item is moved across a window constituting the scanning area of the counter, which movement is part of the process for loading the item in a baggage cart. The hand-held wands or scanners emit a single scan line which is directed over the bar code by the operator while the stationary optical reader systems produce a multiline scan pattern through which the bar code label is moved, enabling a higher throughput of reading processed bar code labels to occur over that of the hand-held scanner. There has arisen a need for a portable scanning system which does not require the higher throughput of the stationary reader and yet is more convenient to use than hand-held scanning systems.

The background art known to the Applicants at the time of the filing of this application includes: U.S. Pat. No. 4,369,361 which discloses a portable stand-alone desk-top laser scanning workstation including a laser scanning head mounted above a support base facing the operator in which objects bearing bar code symbols to be scanned are passed underneath the head, and U.S. Pat. No. 4,766,297 which discloses a support member for supporting a portable hand-held scanning device in which the fixture includes structure for sensing the presence of an object between the head portion and the base portion of the fixture and for automatically initiating a reading of bar code symbols by the portable hand-held scanning device each time the sensing structure senses the presence of an object.

SUMMARY OF THE INVENTION

A portable overhead bar code scanning system is provided which comprises a base member supporting a post member having an overhanging scanning head portion in which is mounted the optics for generating a multiline scan pattern for scanning a bar code label positioned adjacent the underside of the scanning head portion. Mounted in a neck portion of the scanning head portion is a laser source for outputting a laser beam along the axis of the neck portion towards a routing mirror located in the head portion which directs the laser beam at a rotating spinner member orientated at an angle to the floor of the head portion. The spinner member, which in the present embodiment is composed of a six-sided polygon, directs the received light beam in an opposite and upward direction at a plurality of pattern mirrors which are orientated to reflect the received light beams from the spinner member in a downward direction through an aperture located in the floor of the neck portion. The scanning light beams reflected from the pattern mirrors will form a multiple line scan pattern which scans a bar code label positioned adjacent the aperture in the neck portion. The light reflected from the bar code label is redirected by the pattern mirrors towards the spinner which redirects the reflected light beams at a collection mirror mounted in the head portion adjacent the routing mirror which focuses the reflected light beams at a detector located in the head portion of the scanning device. An electrical cable associated with the detector and the laser source is threaded through the post portion of the scanning device to a electronic box located within the checkout counter which may contain the computer for processing the signals received from the detector member.

It is therefore a principal object of this invention to provide a optical bar code scanning device which enables a bar code label to be scanned by passing the label under the scanner.

It is another object of this invention to provide a bar code scanner which is portable, light weight and has a long depth of field to read various sizes of bar code labels.

It is a further object of this invention to provide a portable overhead bar code scanner which produces a multiline scanning pattern for use in scanning a bar code label which would minimize reading errors by the scanner.

It is another object of the invention to provide a portable overhead bar code scanning device which is low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanied drawings wherein like reference numerals indicate like or corresponding parts throughout the several views and wherein.

DESCRIPTION OF THE PREFERRED EMBODIMENT

Figure 1:
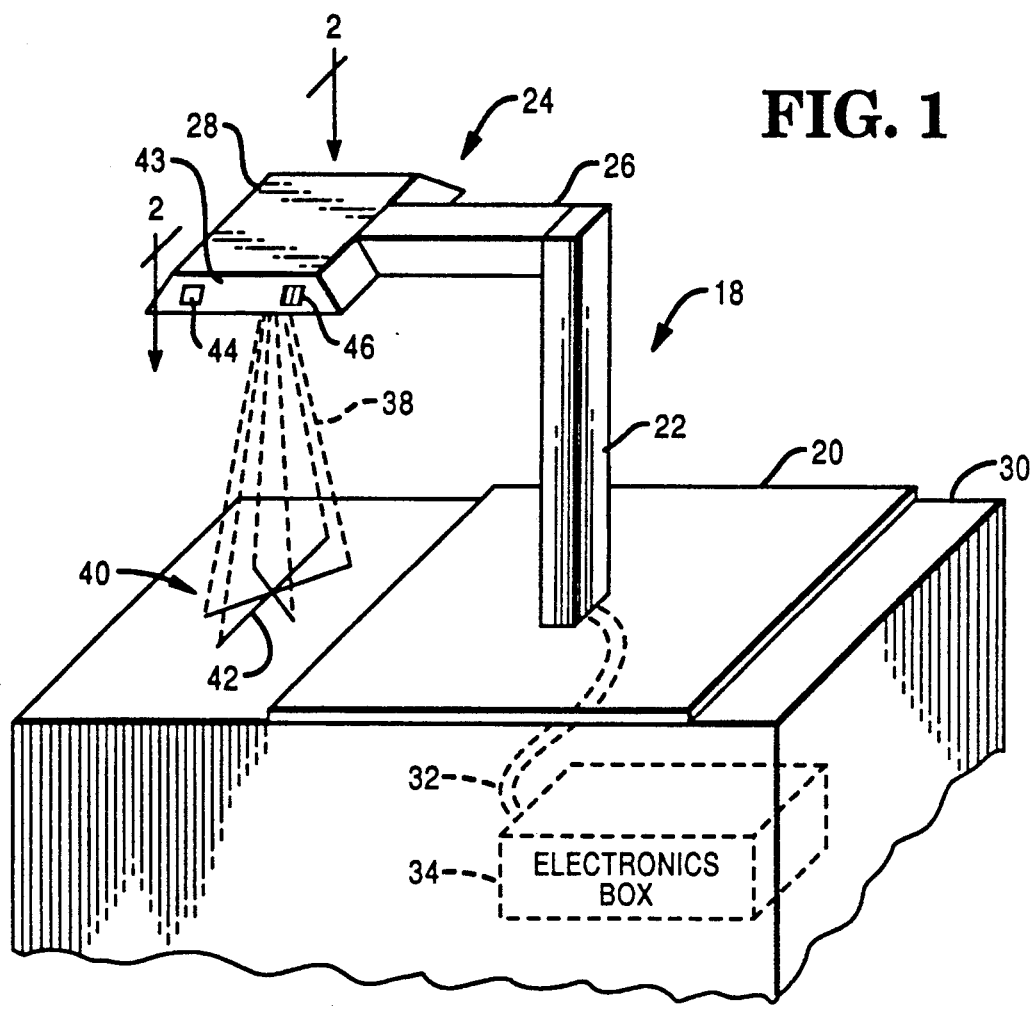
FIG. 1 is a perspective view of the portable overhead bar code scanning device of the present invention positioned on a checkout counter showing the multiline scanning pattern generated by the scanning device together with the location of the electronic box within the counter which is used to control the operation of the scanning device.

Referring now to FIG. 1, there is shown a perspective view of the bar code scanning device generally indicated by the numeral 18 of the present invention which includes a portable base member 20 supporting a post member 22 from which extends a scanning head member generally indicated by the numeral 24. The head member 24 includes a neck portion 26 and a scanning head portion 28 secured thereto within which is located the scanning optics for the scanning device. The bar code scanning device 18 may be positioned on any supporting surface such as the top surface of a checkout counter 30 and has an electrical cable member 32 extending from the bottom of the post member 22 to a electronics box member 34 containing electronics associated with the scanning device for use in processing information generated by the scanning device. As shown in FIG. 1, projecting from the lower side of the head portion 28 are a plurality of scanning light beams 38 which form a bar x scanning pattern represented by the numeral 40 which includes six intersecting scan lines 42, forming the pattern 40. Located in the side wall 43 of the head portion 28 and facing the checkout operator is an indicator light fixture 44 which may include two light members 45 (FIG. 4)(red) and 47 (green) indicating whether the scanning device has successfully read (green) the bar code label or not (red). In addition to the indicator light 44, a loudspeaker 46 mounted in the side wall 43 will generate a tone indicating whether a good read has occurred. The electronics box 34 may be mounted within the checkout counter 30 or positioned adjacent the base member 20 on top of the counter 30.

Figure 3:
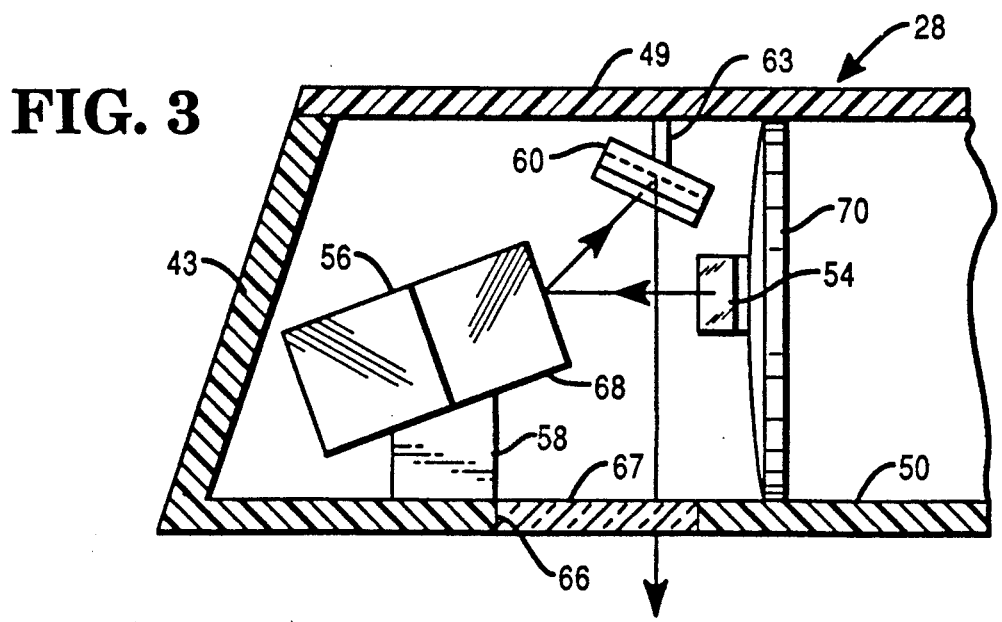
FIG. 3 is an enlarged side sectional view taken on line 3—3 of FIG. 2 showing the direction of the scanning light beams as they are reflected off the spinner member and the pattern mirrors.
Figure 2:
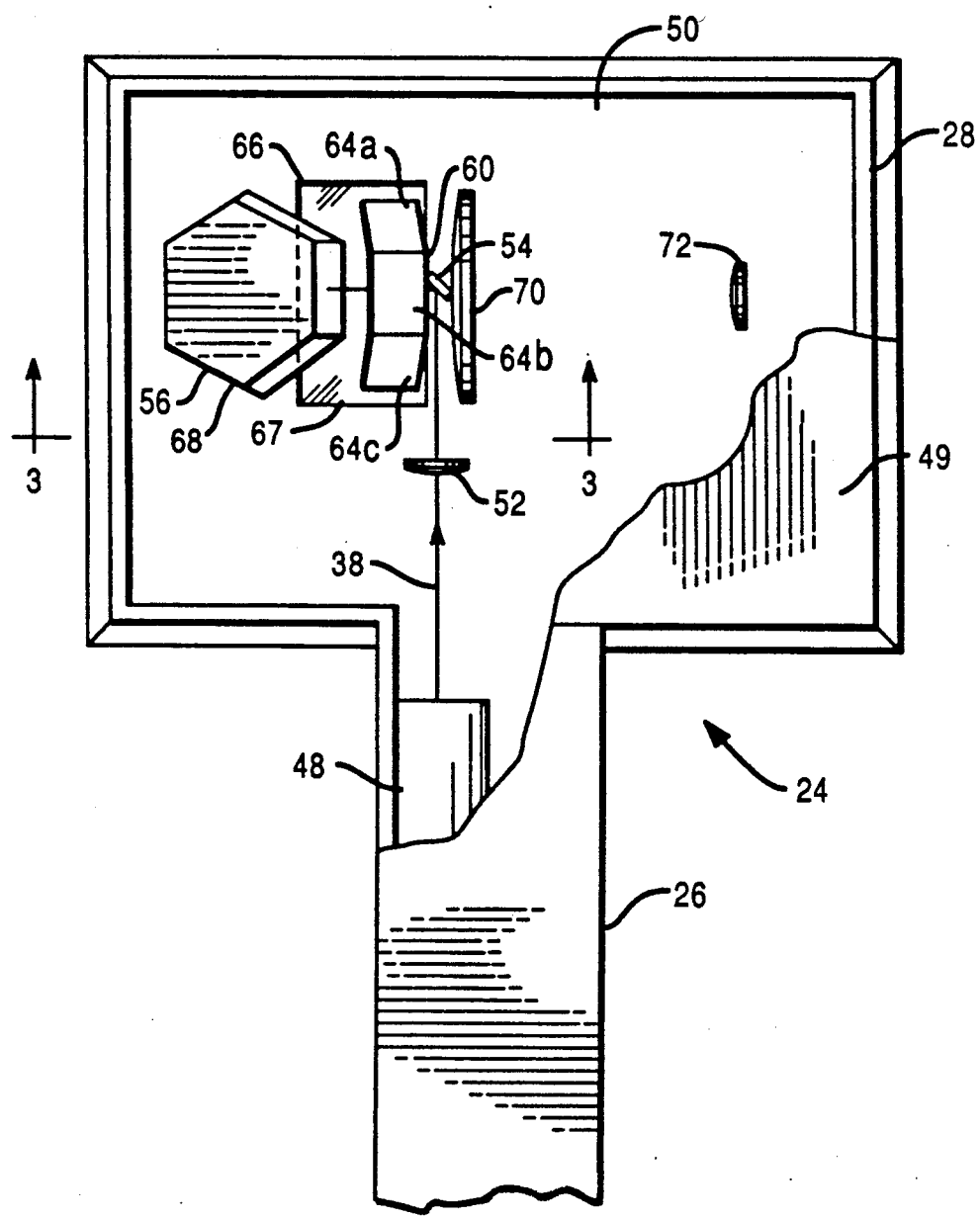
FIG. 2 is a partial top view of the scanning device taken on lines 2—2 of FIG. 1 showing a portion of the laser tube located in the neck portion and the optics located in the head portion of the scanning device for generating a scanning pattern in a downward direction through an aperture in the floor of the head portion.

Referring now to FIG. 2, there is shown a partial top view of the head portion 28 with a portion of the cover member 49 of the head portion removed showing a laser tube member 48 mounted in the neck portion 26 of the scanning head member 24. Mounted within the head portion 28 in line with the laser tube 48 is a collimator lens member 52 which receives the diverging laser light beam 38 and focuses the light beam at a specific distance below the floor member 50 of the head portion 28. In the present embodiment, the scanning light beam is focused at a depth of more than ten inches below the floor member 50 of the head portion 28. The collimated light beam outputted by the lens member 52, which would appear as a point in FIG. 3, is directed at a routing mirror 54 (FIGS. 2 and 3) which deflects the received light beam along a horizontal axis to a six-sided polygon spinner member 56 which is rotatably secured to a motor member 58 mounted on the floor member 50 of the head portion 28.

As shown in FIG. 2, the routing mirror 54 deflects the light beam 38 ninety degrees from its original light path towards the spinner member 56 which in turn is tilted at an acute angle such as twenty degrees with respect to the axis of the path of the received light beam. The rotating spinner member 56 will deflect the received light beam to a pattern mirror assembly 60 which is secured to the cover member 49 of the head portion 28 by the support member 63. The mirror assembly 60 comprises three pattern mirrors 64a–64c inclusive (FIG. 2), which are mounted above and between the spinner member 56 and the routing mirror 54. The mirrors in the pattern mirror assembly 60 are offset with respect to each other and to the floor member 50 to generate the individual scan lines 42 (FIG. 1) which comprise the scanning pattern 40 (FIG. 1) in a manner that is well known in the art.

The mirror assembly 60 is also mounted at an angle such as twenty-five degrees with respect to the path of the received light beams to deflect the received scanning light beams in a downward direction as viewed in FIG. 3 through an aperture 66 (FIGS. 2 and 3) in the floor member 50 containing a window member 67 to form the scanning pattern 40 (FIG. 1) at a predetermined distance below the floor member 50 of the head portion 28. The path of the light beams deflected from the pattern mirror assembly 60 is generally perpendicular to the path of travel of the light beam deflected from the routing mirror 54. Because the pattern mirror assembly 60 is mounted above the routing mirror 54 and the spinner member 56, a very compact and simple optical scanning system is provided. In the present embodiment, the thickness of the head portion 28 is less than three inches. The scanning optical system of the present invention generates the three-cross-lines scanning pattern 40 (FIG. 1) which increases the reading capability of the scanning device because the size of the scanning pattern 40 changes as a bar code label (not shown) is positioned by the checkout operator at different distances from the head portion 28 enabling the scanning device to read large size bar code labels and small size bar code labels.

The light reflected from the scanned bar code label (not shown) is redirected back to the pattern mirror assembly 60 which deflects the light beams to the spinner member 56 which in turn deflects the received light beams to the routing mirror 54. The light reflected from the scanned bar code label is in a scattered condition which is collected by a collection lens 70 mounted between the cover member 49 and the floor member 50 of the head portion 28. The collection lens 70, which supports the routing mirror 54, will focus the received scattered light beams at a detector 72 (FIG. 2) which is mounted to the floor member 50 of the head portion 28. As is well known in the art, the detector member 72 to which the cable 32 (FIG. 1) is connected will generate electrical signals in accordance with the intensity of the received light beams. The electrical signals are transmitted to a microprocessor 76 (FIG. 4) located in the electronics box 34 (FIG. 1) for processing.

Figure 4:
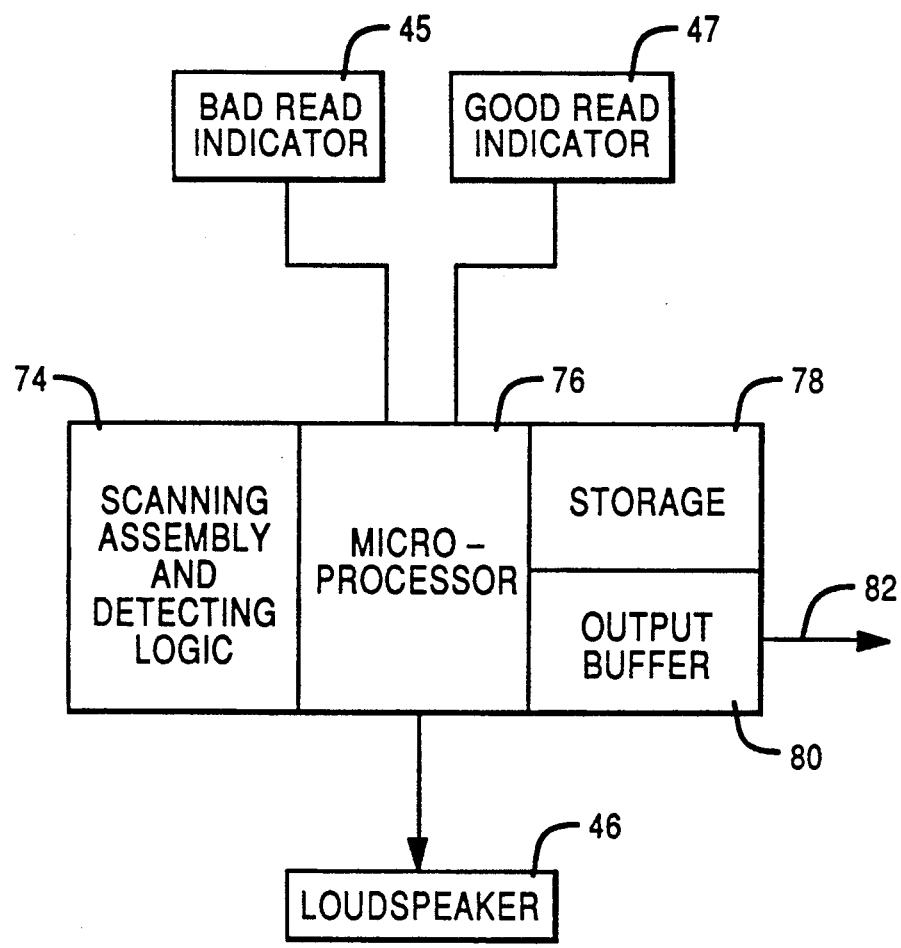
FIG. 4 is a block diagram of the checkout system of the present invention.

Referring now to FIG. 4, there is shown a block diagram of the data processing system employed in the present invention. Included in the data processing system is a scanning assembly and detection logic unit 74 which includes the bar code scanning device 18 (FIG. 1) for converting scanned bar codes into electrical signals. Further included in the processing system is a microprocessor 76 for checking and decoding the signals read by the detecting logic unit 74 and for generating control signals to the bad read indicator 45, the good read indicator 47 and the loudspeaker 46, to indicate the validity of a scanning operation by the scanning device 18, as previously described. Also included in the data processing system is a conventional storage unit 78 and an output buffer 80 for transmitting the data signals read by the detecting logic 74 over line 82 to a remote processor for obtaining the price of the item associated with the coded label read in a manner that is well known in the art.

It will be seen that the portable overhead bar code scanner of the present invention is ideal for small checkout areas because it takes up minimal counter space. The overhead scanner is also easier to use than a hand-held scanner because both hands of the checkout operator are free to move the purchased merchandise on the checkout counter 30. The present bar code scanner is more productive than a hand-held scanner because it generates a multiple line scanning pattern rather than a single line pattern. The bar X scanning pattern 40 (FIG. 1) generated by the scanning device of the present invention requires no item orientation in the horizontal plane with respect to the scanning aperture 66. Since there is no direct contact between the scanned objects and the scanning window member 67, such as is present in a stationary optical scanner, there is no need for window replacement due to wear. Because the scanning beams are directed downward towards the bar code label to be scanned, it is easy for the checkout operator to observe the scan pattern and to move the bar code label through the observed pattern. Additionally, since the scanning beams are directed downward towards the counter top of the checkout counter, the operator is not in a position of looking into the emitted scanning beams such as is now the case with conventional stationary scanners. The scanning indicators such as the good/bad read indicator 44 (FIG. 1) and the loudspeaker 46 are located in the head portion 28 at approximately the height of the operator's head, enabling such indicators to be more discernible by the operator.

Although the preferred embodiment of the present invention has been described herein, it is not intended that the invention be restricted thereto, but that it be limited only by the true spirit and scope of the appended claims.

What is claimed is:

1. A compact scanning system for scanning coded symbols comprising;

a support member mounted on a supporting surface;

a housing member secured to said support member and located above said supporting surface, said housing member including a floor portion having an aperture facing said supporting surface;

said housing member further including a neck portion secured to said support member, said neck portion including means for projecting a scanning light beam along a first light path within said neck portion and said housing member;

first optical means mounted in said first light path for deflecting the light beam along a second light path extending in a horizontal direction perpendicular to said first light path;

scanning means mounted to the floor portion of the housing member and positioned at an angle to said second light path for cyclically sweeping the light beam in a generally upward direction along a plurality of third light paths which are generally opposite to and at an angle to the direction of the light beam projected along said second light path to produce a plurality of light beams;

a plurality of second optical means mounted above said first, second and third light paths and said scanning means and in said plurality of third light paths for directing the light beams along a plurality of fourth light paths generally perpendicular to said first and second light paths and through said aperture for scanning a coded label positioned adjacent said aperture to produce a plurality of light beams reflected from the scanned coded label;

collecting means mounted within said housing member downstream from said scanning means and in a direction perpendicular to said second light path for collecting and transmitting the light beams reflected from the coded label; and detector means mounted in said housing member and positioned downstream from said collecting means for receiving the reflected light beams transmitted from said collecting means for generating electrical signals in response to receiving the collected light beams from the collecting means.

2. The scanning system of claim 1 in which said scanning means comprises a rotating hexagon member mounted at an acute angle to said second light path for deflecting the light beam along said third light paths which extend in an upward direction above the second light path and in the opposite direction of the light beam deflected over the second light path.

3. The scanning system of claim 2 in which the acute angle is twenty degrees.

4. The scanning system of claim 2 in which said second optical means comprises a plurality of attached mirrors mounted at an acute angle to said third paths for deflecting the light beams in a downward direction with respect to said second light path and through said aperture to scan a coded label positioned adjacent the aperture.

5. The scanning system of claim 4 in which the attached mirrors are mounted at an angle of twenty-five degrees.

6. The scanning system of claim 1 in which said support member comprises a hollow vertically extending post portion secured to a base member, said scanning system further including processing means for processing electrical signals generated by said detector means and a cable member positioned within said post portion and connected to the detector means and the processing means enabling the processing means to be remotely located from said base member.

7. The scanning system of claim 1 in which said housing member extends in a horizontal direction and whose vertical thickness is less than three inches, said housing member having a sidewall portion in which is mounted light indicating means for indicating a good or bad read operation of the coded label by the scanning system.

8. A portable laser scanning system for scanning coded labels comprising:

a supporting structure positioned on a supporting surface;

a scanning assembly secured to said supporting structure and extending in a horizontal plane above said supporting surface;

said scanning assembly including a thin housing member having a neck portion secured to said supporting structure in which the housing member and the neck portion are located in the same horizontal plane, said housing member including a cover portion and a floor portion in which the floor portion includes an aperture facing the supporting surface adjacent to which a coded symbol is positioned;

a source of laser light beams mounted in the neck portion for projecting a light beam along a first light path in said horizontal plane in said housing member;

a first mirror member mounted in said housing member and in said first light path for deflecting the light beam along a second light path in said horizontal plane in said housing member which is at ninety degrees to said first light path;

a spinner assembly rotatably mounted at an angle to said horizontal plane in said housing member and at an acute angle to said second light path for cyclically sweeping upward a plurality of light beams generated from the light beams applied thereto along a plurality of third light paths which are generally in a different direction from and above the direction of the light beam transmitted along said second light path; and a mirror assembly mounted to said cover portion of said housing member and in said third light paths for directing the light beams in a downward direction which is generally perpendicular to said second light path and through the aperture for scanning a coded label positioned adjacent the aperture to provide a plurality of light beams reflected from the coded label.

9. The scanning system of claim 8 in which said spinner assembly includes a multifaceted hexagon member orientated at an acute angle to said second light path and a drive member secured to said floor portion of said housing member and rotatably supporting said hexagon member at said acute angle for rotating the hexagon member.

10. The scanning system of claim 9 in which the acute angle is twenty degrees.

11. The scanning system of claim 8 which further includes means mounted in said housing member perpendicular to said horizontal plane, adjacent said mirror assembly, downstream from said spinner assembly and in line with said second light path for collecting the light beams reflected from the coded label which are redirected in the opposite direction along said second light path to said collecting means.

12. The scanning system of claim 11 in which said collecting means comprises a lens member mounted between the cover portion and the floor portion of said housing member for collecting and focusing the reflected light beams at a designated location within the housing member downstream from said lens member, said scanning system further including detector means mounted within said housing member at said designated location for receiving the collected light beams, said detector means generating electrical signals in accordance with the intensity of the reflected light beams received.

13. The scanning system of claim 8 in which said mirror assembly comprises a plurality of attached mirror members positioned offset to each other and mounted to the cover portion of the housing member at an acute angle to said third paths for deflecting the light beams in a downward direction with respect to said second light path through said aperture to scan a coded label positioned adjacent the aperture.

14. The scanning system of claim 13 in which the attached mirror members are mounted at an angle of twenty-five degrees to the third light paths.

15. The scanning system of claim 14 in which said housing member has a vertical thickness of less than three inches, said housing member having a side wall portion in which is mounted light indicating means for indicating a good or bad read operation of the coded label by the scanning assembly.

* * * * *